(12) United States Patent
Tiwari et al.

(10) Patent No.: US 12,024,105 B2
(45) Date of Patent: Jul. 2, 2024

(54) LIGHTWEIGHT REAR BUMPER BEAM

(71) Applicant: SABIC GLOBAL TECHNOLOGIES B.V., Bergen op Zoom (NL)

(72) Inventors: Anil Tiwari, GA Geleen (NL); Simon Staal, GA Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 334 days.

(21) Appl. No.: 17/294,783

(22) PCT Filed: Dec. 3, 2019

(86) PCT No.: PCT/EP2019/083380
§ 371 (c)(1),
(2) Date: May 18, 2021

(87) PCT Pub. No.: WO2020/120213
PCT Pub. Date: Jun. 18, 2020

(65) Prior Publication Data
US 2022/0009434 A1    Jan. 13, 2022

(30) Foreign Application Priority Data
Dec. 13, 2018  (EP) ..................................... 18212267

(51) Int. Cl.
*B60R 19/03* (2006.01)
*B60R 19/02* (2006.01)
*B60R 19/18* (2006.01)

(52) U.S. Cl.
CPC ............ *B60R 19/03* (2013.01); *B60R 19/023* (2013.01); *B60R 2019/184* (2013.01); *B60R 2019/1846* (2013.01)

(58) Field of Classification Search
CPC . B60R 19/03; B60R 19/023; B60R 2019/184; B60R 2019/1846; B60R 19/34;
(Continued)

(56) References Cited

U.S. PATENT DOCUMENTS 6,099,055 A * 8/2000 Hirota ..................... B60R 19/18
293/120
6,286,879 B1 * 9/2001 Haque ..................... B60R 19/03
293/120
(Continued)

FOREIGN PATENT DOCUMENTS

DE    19937183 A1    2/2000
EP    2322386 A1    5/2011
(Continued)

OTHER PUBLICATIONS

International Search Report; International Application No. PCT/EP2019/083380; International Filing Date—Dec. 3, 2019; Date of Mailing—Jan. 22, 2020, 3 pages.

*Primary Examiner* — Pinel E Romain
(74) *Attorney, Agent, or Firm* — CANTOR COLBURN LLP (57) ABSTRACT

The present invention is about a bumper beam comprising: —a first end portion and a second end portion, —a center beam contiguous with and oriented between the first end portion and the second end portion, wherein the center beam comprises a front face and a back face; wherein the center beam has a center section and end sections at opposite ends of the center section, the end sections being adjacent to the end portions, respectively, wherein the center beam comprises horizontal and vertical ribs extending from the front face and the back face and/or between the front face and the back face, wherein the bumper beam is made of a plastic material.

14 Claims, 7 Drawing Sheets

(58) Field of Classification Search
CPC ...... B60R 19/18; B62D 21/152; B62D 21/02; B62D 25/08; B62D 25/2027; B62D 29/008; B62D 25/087; F16F 7/12; B60K 2001/0416
USPC ..... 293/120, 133, 102; 296/187.11; 188/371
See application file for complete search history.

(56) References Cited

U.S. PATENT DOCUMENTS

| | | | | |
|---|---|---|---|---|
| 7,357,430 | B2* | 4/2008 | Karlander | B60R 19/18 293/102 |
| 7,794,006 | B2* | 9/2010 | Karlander | B60R 19/18 296/102 |
| 8,801,084 | B2* | 8/2014 | Gonin | B60J 5/101 296/187.11 |
| 8,851,539 | B2* | 10/2014 | Mana | B60R 19/03 293/120 |
| 9,598,033 | B1 | 3/2017 | Berger et al. | |
| 10,065,587 | B2* | 9/2018 | Martini | B60R 19/03 |
| 10,786,971 | B2* | 9/2020 | Roberts | B29C 44/18 |
| 11,046,268 | B2* | 6/2021 | Bader | B60R 19/18 |
| 11,130,525 | B2* | 9/2021 | Maier | B62D 21/152 |
| 11,318,900 | B2* | 5/2022 | Lee | B60R 19/34 |
| 2003/0141729 | A1* | 7/2003 | Burkhardt | B60R 19/34 293/133 |
| 2007/0144851 | A1* | 6/2007 | Ginja | B60R 19/18 188/371 |
| 2011/0187134 | A1* | 8/2011 | Steller | B60R 19/48 293/115 |
| 2015/0367795 | A1* | 12/2015 | Lee | B60R 19/18 293/133 |
| 2016/0001722 | A1* | 1/2016 | Nickel | B60R 19/03 293/120 |
| 2018/0141512 | A1* | 5/2018 | Munjurulimana | B60R 19/18 |

FOREIGN PATENT DOCUMENTS

| | | |
|---|---|---|
| EP | 2325057 A1 | 5/2011 |
| WO | 2016084020 A1 | 6/2016 |
| WO | 2016193935 A1 | 12/2016 |
| WO | 2018109211 A1 | 6/2018 |

* cited by examiner

Section at 1    Section at 2    Section at 3

Pocket minimum size determined by cooling intensity required

Baffle

Cooling channels with baffle to locally cool deep pockets: could be used f.i. for most critical pockets or alternating pockets

Fig. 9

Nominal geometry  Adjusted geometry

Fig. 10

Nominal geometry  Adjusted geometry

LIGHTWEIGHT REAR BUMPER BEAM

CROSS REFERENCE TO RELATED APPLICATIONS

This application is a National Stage application of PCT/EP2019/083380, filed on Dec. 3, 2019. This application claims priority to EP Application No. 18212267.1 filed on Dec. 13, 2018, the entire contents of which are incorporated herein by reference.

BACKGROUND OF THE INVENTION

Field of the Invention

The present invention relates to a lightweight rear bumper beam. Furthermore, the invention relates to a vehicle comprising such a lightweight rear bumper beam.

Description of the Related Art

A bumper beam, in particular a rear bumper beam, is part of every motor vehicle for protection against low speed vehicle collision condition. Such bumper beam assemblies are designed in such a way that they absorb a large portion of the energy during collision. The rear bumper beam typically extends transversely across the rear end of the motor vehicle.

Traditional bumpers are made from metals, because of their high rigidity. These bumpers are usually made by assembling a plurality of metal parts to form the bumper beam. However, due to recent regulations and to increased fuel efficiency, recent focus has been on reducing the weight of the vehicle while maintaining reduced damage to vehicles in low-speed collisions. In the case of low-speed collisions, energy absorbing assemblies can be used in bumpers and can absorb collision energy to reduce vehicle damage. Injection molded thermoplastic beams offer both light weighting and part count reduction. Thermoplastic beam solutions are already available for rear beams, as described in international patent publications WO2018/109211 and WO2017/021856, but the novel features proposed in the present application would potentially make the beam up to 25% lighter compared to existing thermoplastic beams and up to 40% lighter compared to steel beams, while meeting performance requirements.

BRIEF DESCRIPTION OF THE DRAWING(S)

The following Figures are provided.

BRIEF SUMMARY OF THE INVENTION

According to the invention, there is provided a bumper beam comprising:
a first end portion and a second end portion,
a center beam contiguous with and oriented between the first end portion and the second end portion, wherein the center beam comprises a front face and a back face;
wherein the center beam has a center section and end sections at opposite ends of the center section, the end sections being adjacent to the end portions, respectively,
wherein the center beam comprises horizontal and vertical ribs extending from the front face and the back face and/or between the front face and the back face,
wherein the bumper beam is made of a plastic material.

Varying performance requirements for vehicles have been established by organizations such as the United States Department of Transportation National Highway Traffic Safety Administration (NHTSA), Insurance Institute for Highway Safety (IIHS), the Research Council for Automobile Repairs (R-CAR), and the Economic Commission for Europe (ECE). Regulations governing the low-speed damageability requirements for automobiles across the globe are different. For example, in Europe and the Pacific region, vehicles have to meet ECE-R42 and R-CAR standards at both the front and rear of the vehicle. In the U.S., vehicles have to pass other deformable barrier impact tests such as those set by NHTSA and IIHS.

To validate the structural performance of any rear bumper beam, a test is conducted wherein the rear of the vehicle at its middle axis is subjected to an impact against a fixed 7-inch diameter pole, at a speed of 4 km/h (kilometers per hour). Bumper beams are designed in such a way that the impactor penetration is limited to the extent that the bumper beam is still spaced at least 10-15 mm from the back panel of the body-in-white (BIW) after the impact but at the same time absorbing the maximum amount of energy.

The Research Council for Automobile Repair (herein "R-CAR") test program is used by several test houses and institutes in Europe, Asia, and South America and specifies that front and rear bumper systems of a vehicle meet certain criteria under standardized test conditions. R-CAR assessment of bumper performance is aimed at encouraging manufacturers to design bumper systems that meet a variety of goals, including systems that protect vehicle corners at low speed impact and that have desirable energy absorption. The R-CAR test impacts the bumper member with a solid barrier at a designated speed and seeks a non-destructive bending of the bumper beam along with prevention of damage to the underlying vehicle. In addition, bumper systems can be subject to the Economic Commission for Europe Regulation Number 42 ("ECE-R42"), which specifies that a car's safety systems should continue to operate normally after the car has been impacted by a pendulum or moving barrier under simulated collisions at certain speeds and at certain locations on the bumper assembly. It has been discovered that in order to satisfy R-CAR and ECE-R42 criteria, a rear beam having high stiffness at the corners and high stiffness in the center can be desirable.

The first end portion and the second end portion may each comprise a crash can. To understand the features of the beam, the design of the beam can be subcategorized in to two main features, being a crush box at the ends for corner impact and R-CAR bumper test, and a beam connecting the crush boxes for center impact in ECE-R42. Bumper systems incorporating beams of the present disclosure can conform to desired space constraints while meeting ECE-R42 and/or R-CAR standards and specifications.

Bumper systems including beams of the present disclosure can satisfy R-CAR, including for example low speed damageability insurance tests such as R-CAR Section 0031, and/or ECE-R42 criteria, such as low speed damageability regulation ECE-R42 Section 0031. In an embodiment, a bumper system including a beam of the present disclosure can absorb a corner impact at 2.5 kilometers per hour (kph) when coupled to a vehicle weighing 500 to 2,000 kilograms (kg), for example, 900 to 1,600 kg, with an intrusion of less than or equal to 140 millimeters (mm), where intrusion refers to the amount the beam intrudes into the passenger compartment of the vehicle. The beams of the present disclosure can have higher stiffness than conventional beams, and can have lower levels of intrusion. In an embodiment, a bumper system including a beam of the present disclosure can absorb a center pendulum impact at 4 kph when coupled to a vehicle weighing 500 to 2,000 kg, for example, 900 to 1,600 kg, with an intrusion of less than or equal to 140 mm. In an embodiment, a bumper system including a beam of the present disclosure can absorb an outboard impact at 4 kph when coupled to a vehicle weighing 500 to 2,000 kg, for example, 900 to 1,600 kg, with an intrusion of less than or equal to 140 mm.

This invention talks about novel design features and their manufacturing for a rear bumper beam (also known as cross member) of an automobile. Light weighting auto-parts is one of the prime requirement of the car manufacturers and they always push the limit for designing and engineering to get the lightest possible design without affecting the performance and styling. The primary function of rear bumper beam is to reduce the low speed damageability of a car. A traditional steel solution is not only bulky but also made of several parts, increasing the part counts and complexity in installation. Several injection moldable thermoplastic solution are also available for rear bumper beam. In this invention disclosure, we are proposing three unique design features for rear beams harvesting the design freedom of an injection molding process to achieve lighter beams with equal or better performance.

In this invention, we are addressing ECE-R42 pendulum impact requirement for the beam. One of the most critical requirement for ECE-R42 (or GB17354) standard is center pendulum impact. In center pendulum impact, the beam is being hit by a relatively rigid pendulum at the center with a speed of 4 km/hr. The center of the pendulum bumper should be at height of 458 mm (or 18 inches) from the ground for ECE-R42 standard and it should be at a height of 445 mm from the ground for GB17354. The height of the center of the pendulum with respect to the ground is called the ground clearance.

Figure 1:
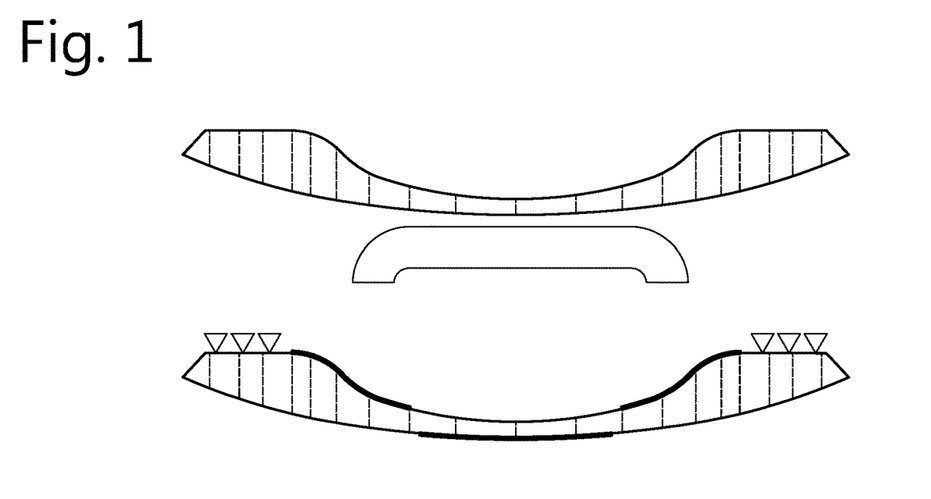
FIG. 1 shows a beam.
Figure 2:
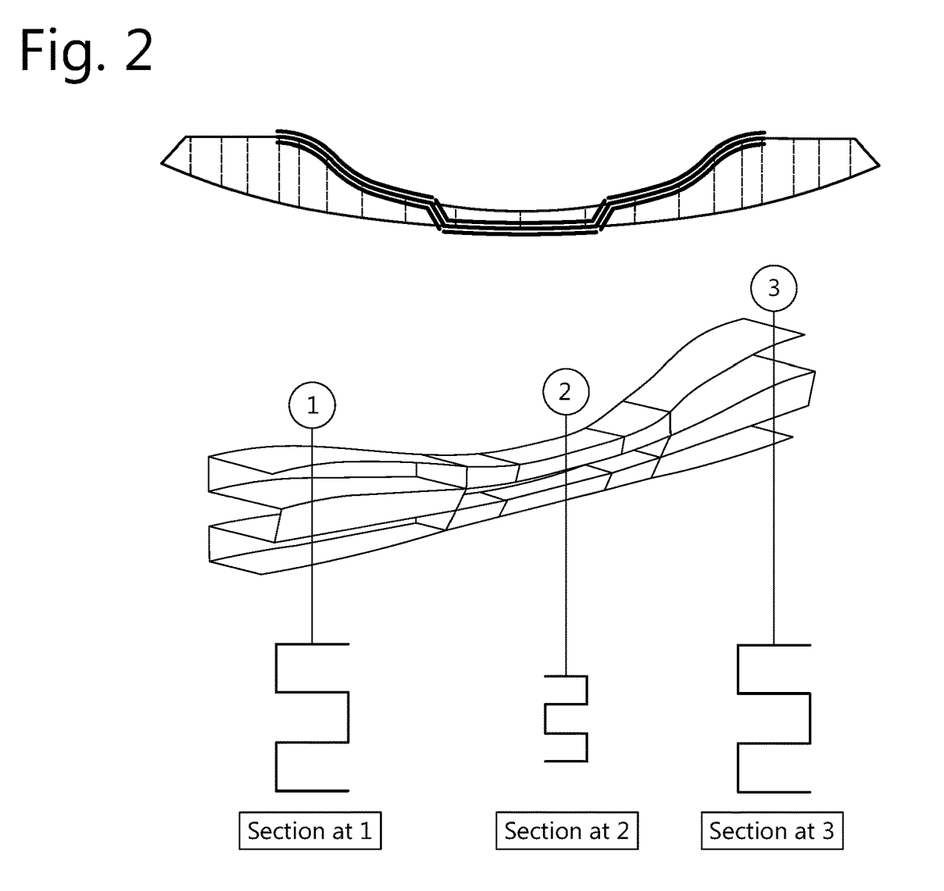
FIG. 2 shows a beam with variable sections.

The first idea is to improve the bumper beam design to enhance crash performance. For the center pendulum impact, the beam region is the critical region responsible for transferring the load to the fixation location. For center pendulum impact, the region on the beam contributing to the stiffness is the center section of the center beam. The center pendulum impact forms a load path from the front face of the center section of the center beam to the back face of the end sections of the center beam, as shown in FIG. 1. For a constant cross section beam design, there is sufficient material at the center of the beam but the available material at the ends is relatively less.

The variable section of the beam: For putting the maximum amount of material in the load transfer region. This can be improved by flipping the section at the ends so that the cross section at the end of the beam is mirror image of cross section at the center of the beam. It may be that a cross section of the center section is reversed with respect to a cross section of the respective end sections, such that a load transfer path is created along the center beam from the center section via the end sections to the end portions.

The front face of the center section may comprise a first base from which multiple horizontal ribs extend towards the back face of the center section, thus forming one or more cavities at the back face of the center section, and wherein the back face of each end section comprises a second base from which multiple horizontal ribs extend towards the front face of the end section, thus forming one or more cavities at the front face of the end section and wherein the first and second base are connected through a diagonally oriented rib. Moreover, the cross section of the center beam is shaped as two U-shapes connected with a vertical flange at neighboring legs.

The variable height of the beam: To keep thicker section with lower height at the center avoiding local bucking and thereby optimizing the material usage for maximum stiffness of the beam. A height of the center section may be less with respect to the height of the end sections and/or the end portions, such that a first side edge of the center portion is offset with respect to a second side edge of an adjacent end section and/or end portion, creating an offset distance between the respective side edges. The first side edge of the center portion and the second side edge of the end section and/or end portion form a pair of side edges, and wherein the offset distance between opposite pairs of side edges is equal or different. In other words, a distance between opposite second side edges of the center section at a central axis of the bumper beam is less than a distance between opposite first side edges of the end sections and/or the end portions. The first and second side edges may form a single smooth side edge of the center beam and/or bumper beam.

Figure 3:
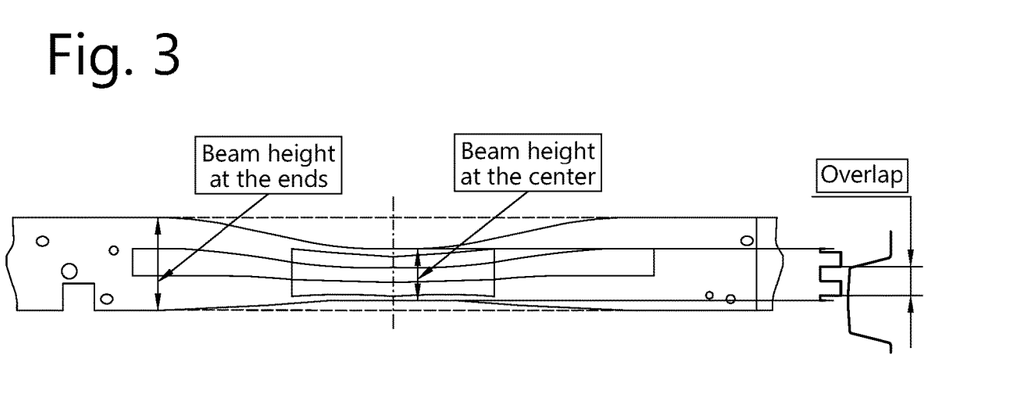
FIG. 3 shows a height of the beam is a maximum near the ends.
Figure 4:
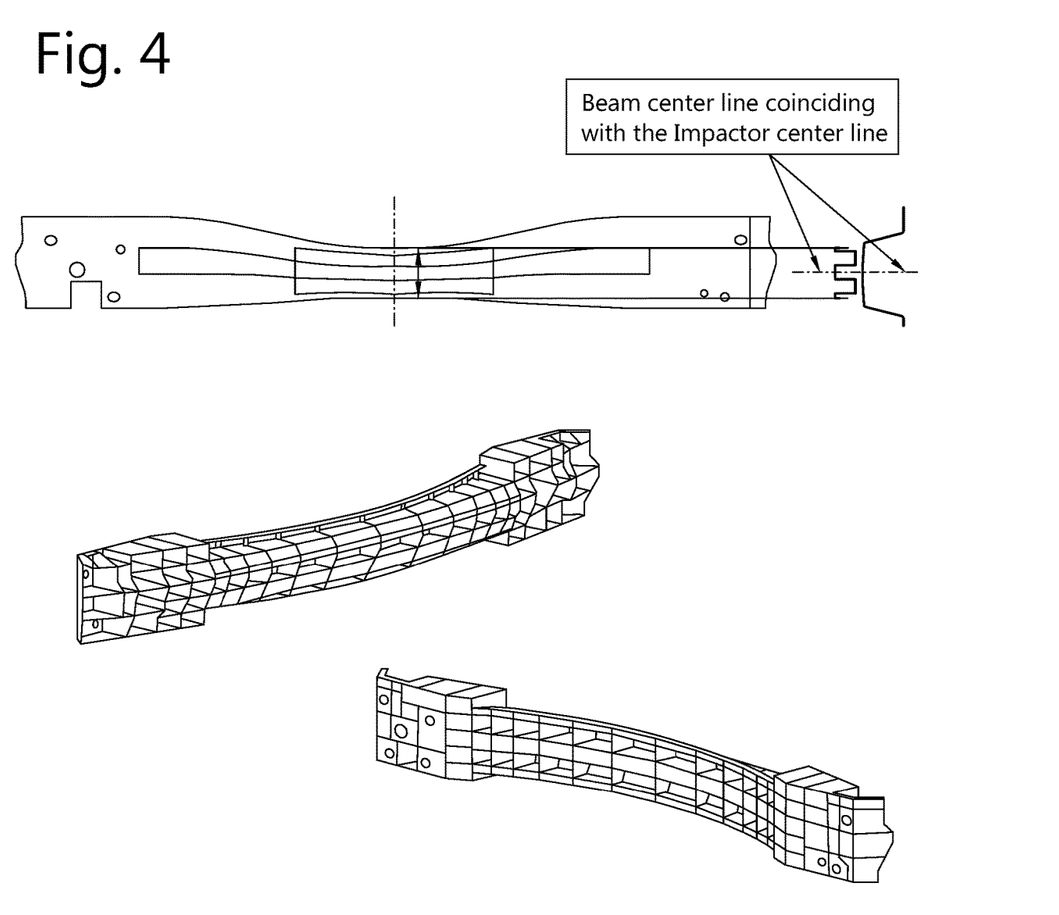
FIG. 4 shows an impact where a centerline of the beam is at a centerline of the impactor.
Figure 5:
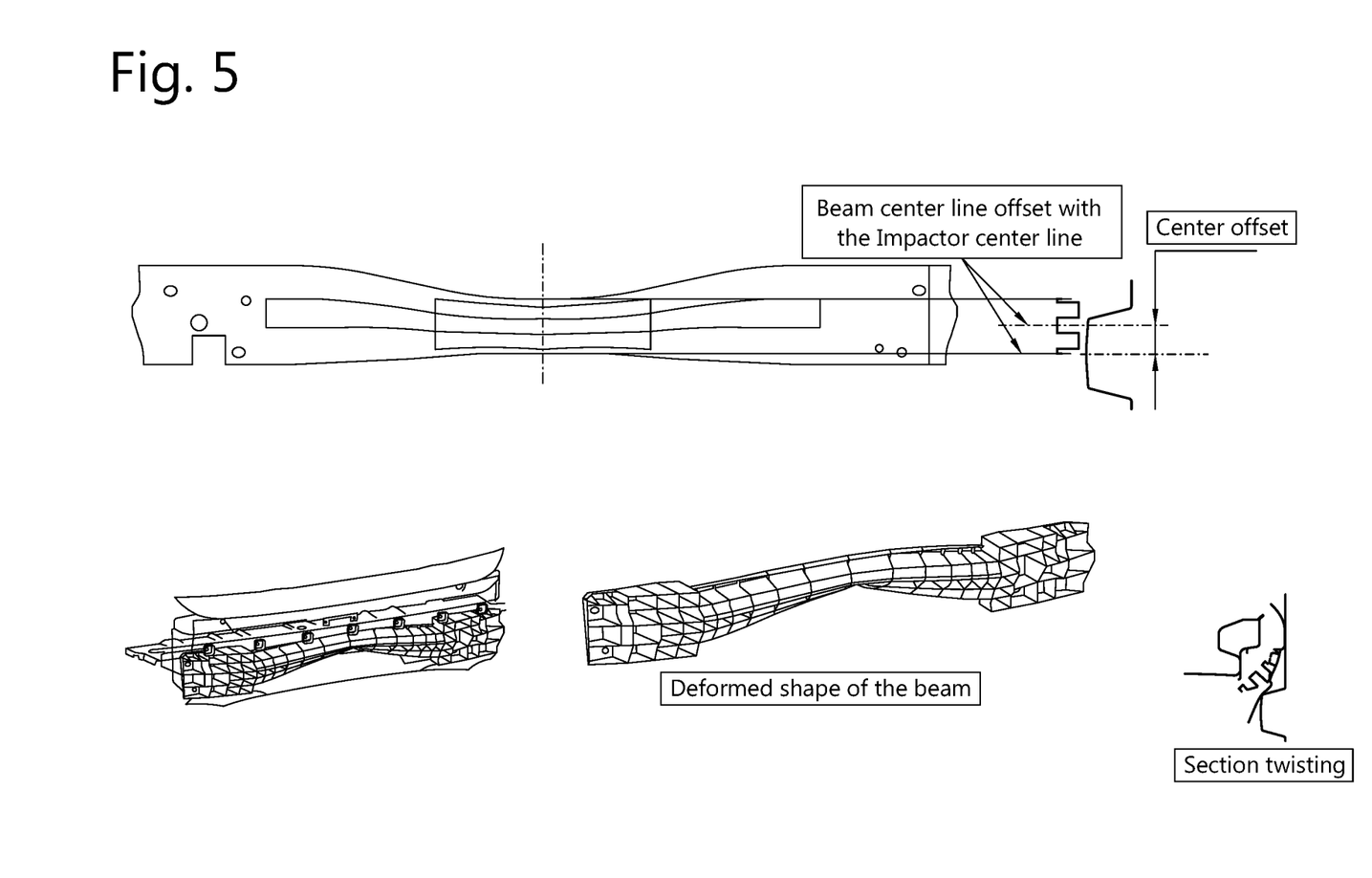
FIG. 5 shows an impact where a centerline of the beam is offset from a centerline of the impactor.

The height of the beam should be maximum near the ends, and at the center it should be such that it has maximum overlap with the pendulum. Height of the beam at the center does not need to be more than the height of the impactor. However, in deciding the height of the beam we need to consider manufacturability of the beam also. The change in beam height can be gradual from maximum at the ends to optimal (for maximum overlap) at the center, keeping tangency with the horizontal plane for smooth stress flow. This also allows us to remove material away from load transfer path without complicating the injection-molding tool. FIGS. 3 and 4 show an example of how the beam height should vary. If the beam is centered with the impactor as shown in FIG. 4, the beam will be predominantly in bending mode and Rectangular ribs are sufficient for good bending stiffness. But if the beam is NOT centered with the impactor as shown in FIG. 5, because of the offset (eccentricity), the beam will also experience a twisting moment and regular rectangular ribs have very low stiffness to withstand the twisting moment. The same can be observed in the deformed shape of the beam in FIG. 5.

Adding cross (oblique or diagonal) ribs: To improve torsional stiffness of the beam for situation when the overlap between the impactor and the beam is small due the aggressive styling of the bumper fascia. For such cases, oblique or cross ribs towards the end of the beam can significantly improve the torsional stiffness.

Diagonally oriented ribs or cross ribs may be provided in at least a portion of the center beam and wherein the diagonally oriented ribs extend between the vertical and/or horizontal ribs. The angle between the longitudinal axis of the bumper beam and the diagonally oriented ribs may be more than 0 degrees and less than 90 degrees, preferable between 20 and 70 degrees, more preferably between 30 and 60 degrees, most preferably between 40 and 50 degrees, or any combination thereof. Preferably, the diagonally oriented ribs are at least provided in the end sections of the center beam.

Figure 6:
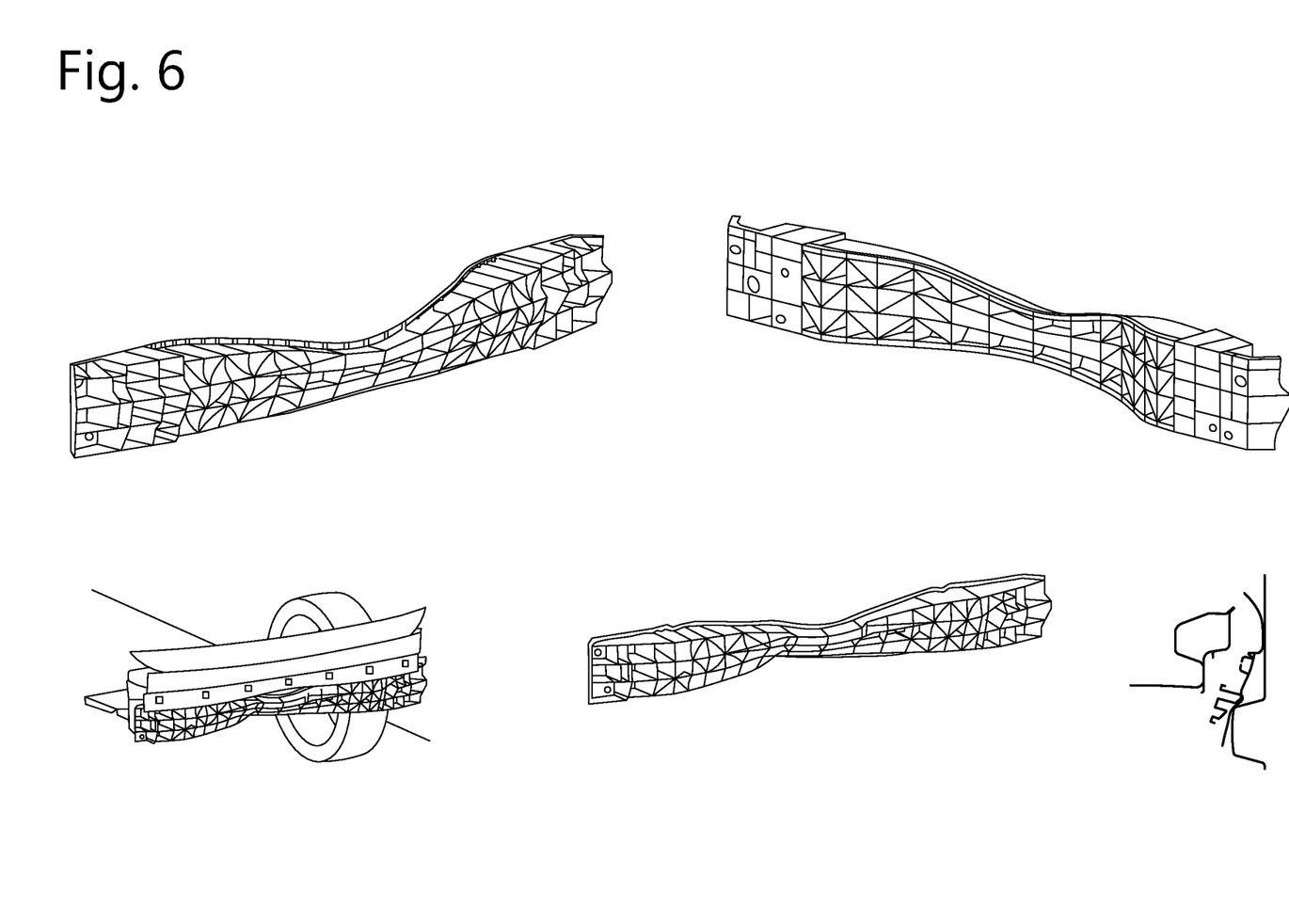
FIG. 6 shows cross ribs within the beam.

The above described measures of varying the cross section of the center beam, varying the height of the center beam in the longitudinal direction, and adding cross ribs to part of the center beam have been used to design an embodiment of the beam according to the invention. The resulting design and deformation of the beam for the center pendulum impact is shown in FIG. 6.

In addition to the above embodiments, we are also proposing novel techniques to address potential issue with manufacturability of such beam using injection-molding process. These techniques include efficient design of injection molding tool and minor modification in the part geometry to improve manufacturability. Designing a lighter weight rear beam (or cross member) for a car that meets low speed damageability criterion (European ECE-R42 and Chinese GB17354).

As per the requirement, the beam should have sufficient stiffness to transfer the load from impactor at limited design space (intrusion) and at the same time, it should have the lowest mass to keep the car lightweight. These two requirements are contradictory in nature posing significant challenge in designing the beam. On the other hand, injection-molding process offers design freedom over conventional metal forming. Devised unique and novel design feature (independent of material) will not only make the beam lighter compared to existing designs but also reduce the low speed damageability of the vehicle.

Figure 7:
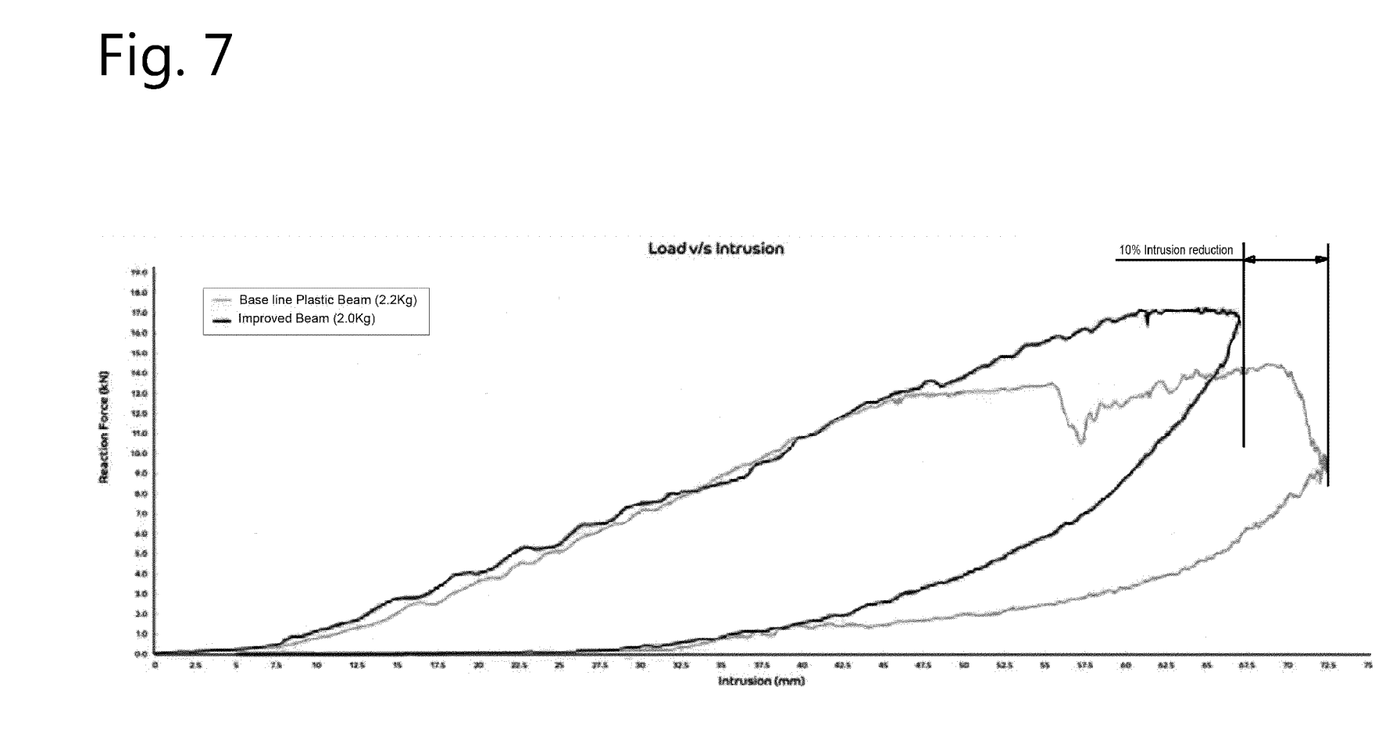
FIG. 7 shows a chart that illustrates comparing load vs. intrusion performance of the disclosed design with a baseline design.

Comparing load vs. intrusion performance of new design with the baseline design, it shows (in FIG. 7) that there is a 20% increase in load bearing capacity, a 10% reduction in intrusion level, and/or a 10% lower mass with respect to a comparative base line plastic bumper beam. The invention allows for a design of rear beams with efficient crash performance for vehicles with limited design space.

The invention also relates to a vehicle comprising a bumper beam according to any of the preceding claims.

Furthermore, the invention relates to a method of manufacturing a bumper beam as described above, the method comprising:
injection molding plastic material into a mold;
locally cooling the injection molded material using baffles and coolant.

The method may further comprise adding one or more mold inserts into the mold before injection plastic material, wherein the mold insert has a higher thermal conductivity than the mold.

The beam or part may contain many ribs and deep pockets or cavities on both sides. However, there are no sliders or lifters required for the beam. Thus to determine the most logical orientation of the part (determining the stationary and movable side of the part in the mould), the surface area of geometry shrinking to mould is calculated to determine what side will shrink more strongly on mould. That side is set as movable side. A sequential gating method is proposed to ensure no critical weld lines will occur inside the beam portion of the part. Starting from the center will ensure proper filling of the central beam portion even with reduced beam height.

The beam or part may contain many deep, narrow pockets or cavities. The material around such deep narrow pockets is typically difficult to cool inside an injection moulded part. This is especially true when dealing with relatively large and thick walls getting connected together or crossing, which is the case for the present beam. The time it takes to produce a single piece (the cycle time) will be largely determined by the cooling time for one single part. Efficient cooling will thus have a great impact when producing this part in larger numbers. Removal of heat from the depth of the pocket will be a primary concern to reduce cycle time. A long cooling time increases a risk of a longer cycle time, thus increasing the part manufacturing cost, and/or reduced product quality contributed to introduction of uncontrolled shrinkage, voids, uncontrolled warpage, and/or large sink marks.

The following adjustments can be used to address potential manufacturing issues for the bumper beam according to the invention.

Local Intensive Cooling

Figure 8:
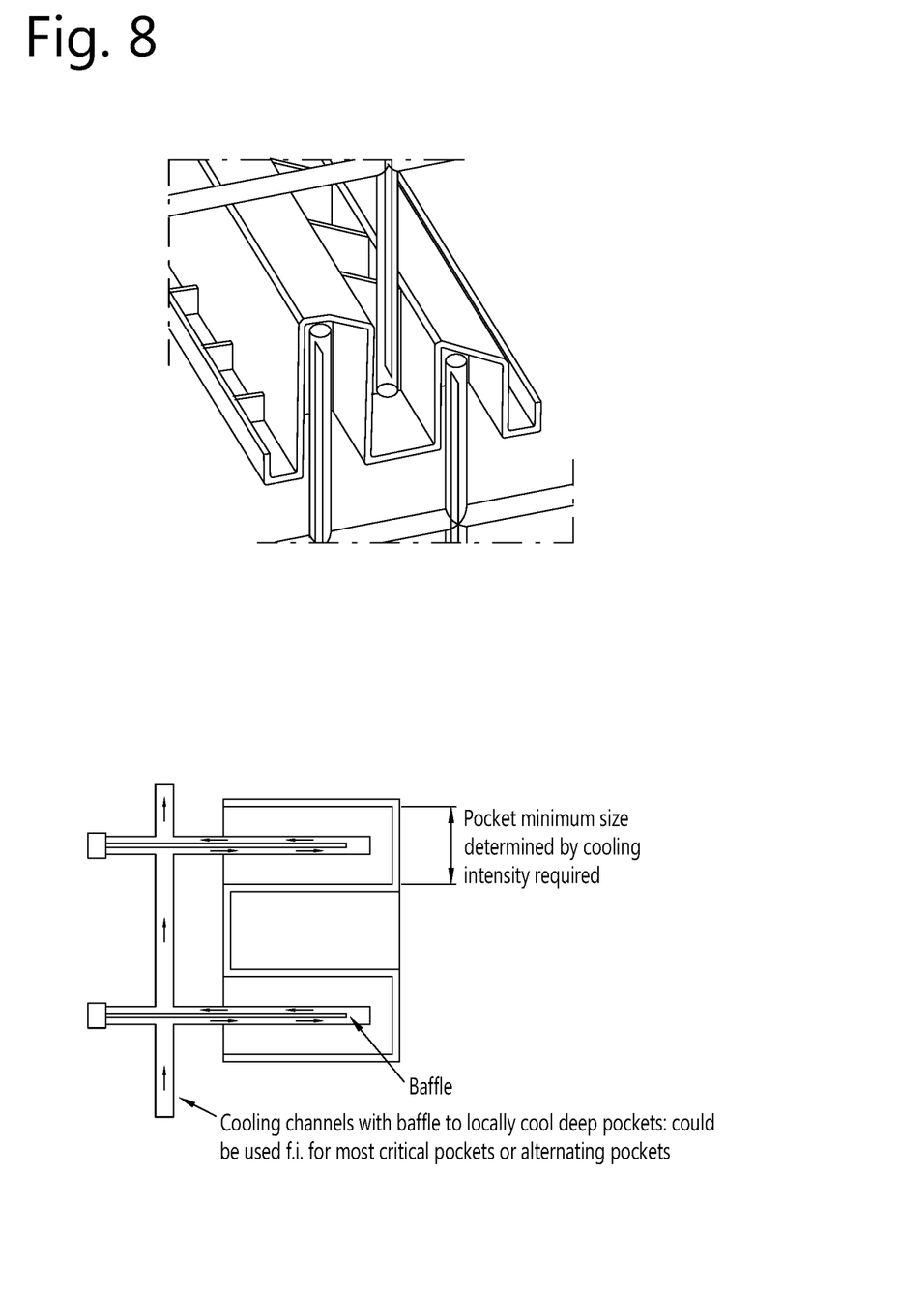
FIG. 8 shows cooling channels with baffles that are provided to cool pockets of the beam.

By using protruded cooling channels and equipping them with baffles and coolant, the heat removal efficiency of the cooling system may be increased at the pockets that are difficult to cool. This solution can be applied to every pocket along the height with alternating pockets along the length. It can also be used in the critical areas. The principle is illustrated in FIG. 8. This solution may place a lower limit on the size of a pocket, to ensure standard mould components can still be used, and enough mould material 'skin' is available around the cooling channel.

Shift of Central Base Plane

Figure 9:
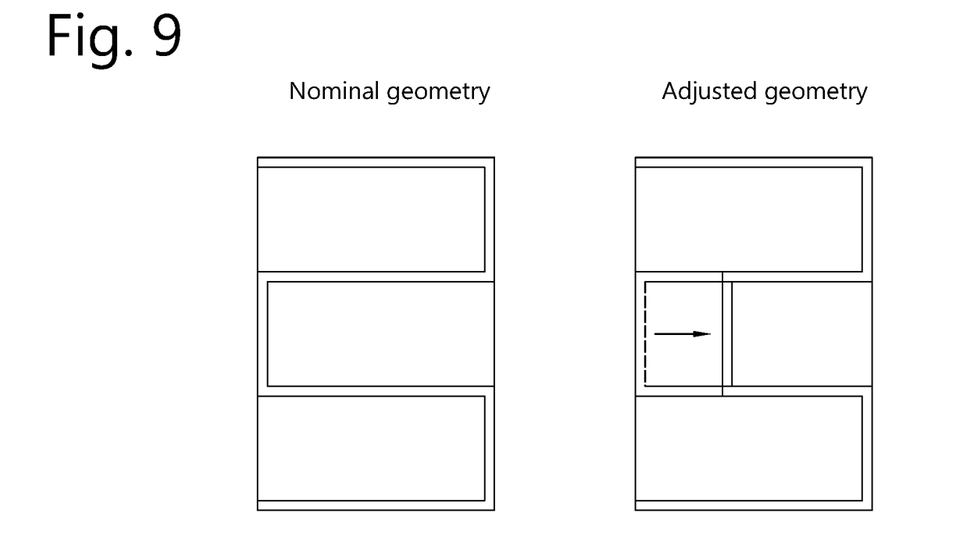
FIG. 9 shows the beam with a central base plane that is moved towards an interior of the pocket.

The cross section of the center beam may be made more efficient to cool by moving the central base plane or base towards an interior of the U-shape, i.e. U-shape may be shifted to an H-shape, or similar. This reduces the depth of a pocket or cavity, thereby decreasing the amount of heat that needs to be extracted from a pocket. This is illustrated in FIG. 9.

Reduced Transverse Rib Height

Figure 10:
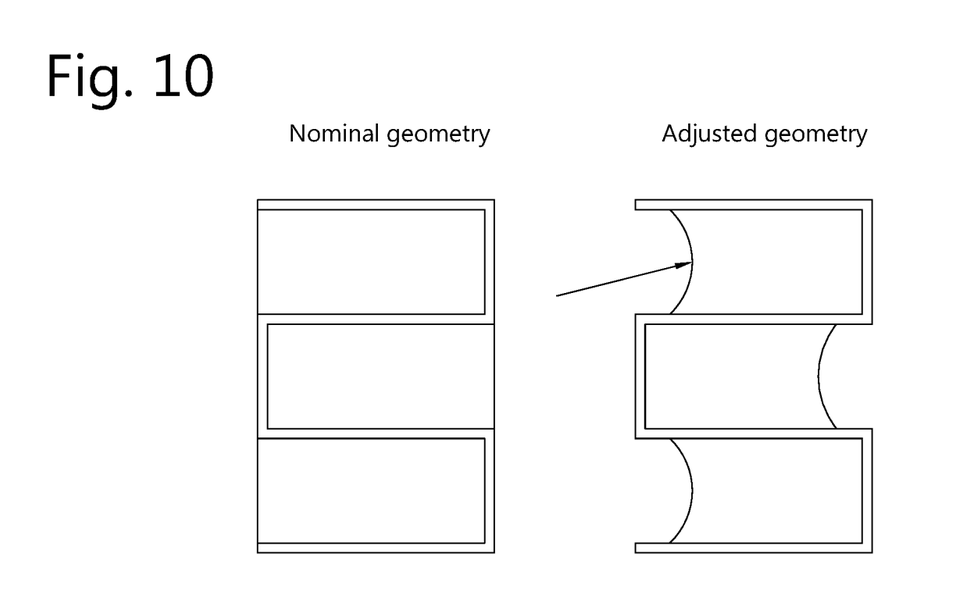
FIG. 10 shows the beam with cutouts in vertical ribs of the pockets.

The top edge of the transverse or vertical ribs inside the U-shape will likely not be loaded mechanically. Making a cut-out in the top of the rib, i.e. a cut out at the edge of the rib opposite of the base, for instance a semi-circular cut-out extending from the edge towards the base, effectively reduces the depth of the pockets or cavities, bringing more cooling capacity closer to the deepest portions of said pocket. This is illustrated in FIG. 10.

High Thermal Conductivity Mould Inserts

Where standard injection moulds may be made of steel or another suitable material, mould inserts with higher thermal conductivity may be used in certain strategic locations. The higher conductivity effectively takes away heat more quickly. This strategy could also be applied for making the bumper beam of this application, especially when no space is available for intensive local cooling, for instance because of hot runner drops or ejectors blocking potential cooling channels from entering a pocket.

Unless otherwise specified herein, any reference to standards, regulations, testing methods and the like, such as RCAR and ECE-R42 refer to the standard, regulation, guidance or method that is in force at the time of filing of the present application.

The invention claimed is:
1. A bumper beam comprising:
a first end portion and a second end portion, a center beam contiguous with and oriented between the first end portion and the second end portion, wherein the center beam comprises a front face and a back face;

wherein the center beam has a center section and first and second end sections at opposite ends of the center section, the first and second end sections being adjacent to the first and second end portions, respectively, wherein the center beam comprises horizontal and vertical ribs extending either from or between the front face and the back face, wherein the bumper beam is made of a plastic material, wherein:

a cross section of the center section defines a plurality of U-shaped pockets connected with a vertical flange at neighboring legs of the U-shaped pockets, and a cross section of the first and second end sections are a mirror image of the cross section of the center section, so that the vertical flange is located at one of the front and back faces of the center section and at the other one of the front and back faces of the first and second end sections, such that a load transfer path is created along the center beam from the center section via the first and second end sections to the first and second end portions.

2. The bumper beam of claim 1, wherein:

a height of the center section is less with respect to a height of the first and second end sections, such that a first side edge of the center portion is height-wise offset, by an offset distance, with respect to a first side edge of the first and second end sections.

3. The bumper beam of claim 1, wherein: the first side edges of the center section and first and second end sections form a single smooth side edge of the center beam.

4. The bumper beam of claim 1, wherein: the first end portion and the second end portion each comprise a crash can.

5. The bumper beam of claim 1, wherein:

diagonally oriented ribs are provided in the center beam and wherein the diagonally oriented ribs extend between one or more of the vertical or horizontal ribs, and wherein the diagonally oriented ribs are disposed at an acute angle relative to the vertical and horizontal ribs.

6. The bumper beam of claim 5, wherein:

the angle between the longitudinal axis of the bumper beam and the diagonally oriented ribs is:

more than 0 degrees and less than 90 degrees;

between 20 and 70 degrees;

between 30 and 60 degrees; or between 40 and 50 degrees.

7. The bumper beam of claim 5, wherein: the diagonally oriented ribs are at least provided in the first and second end sections of the center beam.

8. The bumper beam of claim 1, wherein:

the front face of the center section comprises:

a first base from which multiple horizontal ribs extend towards the back face of the center section, thus forming one or more cavities at the back face of the center section, and wherein the back face of each of the first and second end sections comprises:

a second base from which multiple horizontal ribs extend towards the front face of the end section, thus forming one or more cavities at the front face of the end section, and wherein the first and second bases are connected through a diagonally oriented rib, wherein the diagonally oriented rib is disposed at an acute angle relative to the horizontal ribs.

9. A vehicle comprising: the bumper beam of claim 1.

10. A method of manufacturing the bumper beam of claim 1, the method comprising:

injection molding plastic material into a mold;

locally cooling the injection molded material using baffles and coolant.

11. The method of claim 10, comprising: adding one or more mold inserts into the mold before injection plastic material, wherein the mold insert has a higher thermal conductivity than the mold.

12. A bumper beam comprising:

a first end portion and a second end portion, a center beam contiguous with and oriented between the first end portion and the second end portion, wherein the center beam comprises a front face and a back face;

wherein the center beam has a center section and first and second end sections at opposite ends of the center section, the first and second end sections being adjacent to the first and second end portions, respectively, wherein the center beam comprises horizontal and vertical ribs extending either from or between the front face and the back face, wherein the bumper beam is made of a plastic material, wherein a height of the center section is less with respect to a height of the first and second end sections, such that a first side edge of the center portion is height-wise offset, by an offset distance, with respect to a first side edge of the first and second end sections; and wherein the first side edges of the center section and the first and second end sections form a single smooth side edge of the center beam.

13. The bumper beam of claim 12, wherein:

a cross section of the center section defines a plurality of U-shaped pockets connected with a vertical flange at neighboring legs of the U-shaped pockets, and a cross section of the first and second end sections are a mirror image of the cross section of the center section, so that the vertical flange is located at one of the front and back faces of the center section and at the other one of the front and back faces of the first and second end sections, such that a load transfer path is created along the center beam from the center section via the first and second end sections to the first and second end portions.

14. The bumper beam of claim 12, wherein:

diagonally oriented ribs are provided in the center beam and wherein the diagonally oriented ribs extend between one or more of the vertical or horizontal ribs, and wherein the diagonally oriented ribs are disposed at an acute angle relative to the vertical and horizontal ribs.

* * * * *